(12) United States Patent
Zhang

(10) Patent No.: US 10,404,083 B2
(45) Date of Patent: Sep. 3, 2019

(54) QUICK CHARGING METHOD, POWER ADAPTER AND MOBILE TERMINAL, BIDIRECTIONAL COMMUNICATION USING USB INTERFACE

(71) Applicant: GUANGDONG OPPO MOBILE TELECOMMUNICATIONS CORP., LTD., Dongguan (CN)

(72) Inventor: Jialiang Zhang, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 67 days.

(21) Appl. No.: 15/317,383

(22) PCT Filed: May 13, 2015

(86) PCT No.: PCT/CN2015/078908
§ 371 (c)(1),
(2) Date: Dec. 8, 2016

(87) PCT Pub. No.: WO2016/179817
PCT Pub. Date: Nov. 17, 2016

(65) Prior Publication Data
US 2017/0117728 A1    Apr. 27, 2017

(51) Int. Cl.
*H02J 7/00* (2006.01)
*H04M 19/08* (2006.01)
(Continued)

(52) U.S. Cl.
CPC ............ *H02J 7/0044* (2013.01); *H02J 7/007* (2013.01); *H02J 7/0021* (2013.01);
(Continued)

(58) Field of Classification Search
CPC ...... H02J 7/0044; H02J 7/0021; H02J 7/0052; H02J 7/007; H02J 7/02; H02J 7/04;
(Continued)

(56) References Cited

U.S. PATENT DOCUMENTS

2006/0250233 A1* 11/2006 Powell ............... G01R 31/3648
340/539.1
2006/0284595 A1 12/2006 Hsieh
(Continued)

FOREIGN PATENT DOCUMENTS

CN        102427260 A    4/2012
CN        202268816 U    6/2012
(Continued)

OTHER PUBLICATIONS

Extended European search report issued in corresponding European application No. 18202294.7 dated Dec. 3, 2018.
(Continued)

*Primary Examiner* — Richard Isla
*Assistant Examiner* — Mohammed J Sharief
(74) *Attorney, Agent, or Firm* — Young Basile Hanlon & MacFarlane, P.C.

(57) ABSTRACT

The present disclosure provides a quick charging method, a power adapter, and a mobile terminal. The method includes: transmitting, by the power adapter, clock signal to the mobile terminal via a first data line of the USB interface in a process of that the power adapter is coupled to the mobile terminal, wherein the clock signal indicates a communication sequence between the power adapter and the mobile terminal; conducting, by the power adapter, a bidirectional communication with the mobile terminal via a second data line of the USB interface under control of the communication sequence, so as to determine to charge the mobile terminal in the quick charging mode; and adjusting, by the
(Continued)

power adapter, a charging current of the power adapter to the charging current corresponding to the quick charging mode to charge the mobile terminal.

20 Claims, 3 Drawing Sheets

(51) Int. Cl.
*H02J 7/04* (2006.01)
*H02J 7/02* (2016.01)

(52) U.S. Cl.
CPC .............. *H02J 7/0052* (2013.01); *H02J 7/02* (2013.01); *H02J 7/04* (2013.01); *H04M 19/08* (2013.01); *H02J 7/0068* (2013.01); *H02J 2007/0059* (2013.01); *H02J 2007/0062* (2013.01); *H02J 2007/0096* (2013.01)

(58) Field of Classification Search
CPC ............ H02J 7/0068; H02J 2007/0059; H02J 2007/0062; H02J 2007/0096; H02J 7/0045; H02J 7/0042; H04M 19/08; Y02E 60/12; H01M 2/1022
USPC ........................................................ 320/114
See application file for complete search history.

(56) References Cited

U.S. PATENT DOCUMENTS

| | | |
|---|---|---|
| 2007/0075680 A1 | 4/2007 | Chung et al. |
| 2008/0034378 A1* | 2/2008 | Kumar ................ G06F 13/4086 719/321 |
| 2008/0084189 A1 | 4/2008 | Kim |
| 2009/0177906 A1 | 7/2009 | Paniagua, Jr. et al. |
| 2011/0016341 A1 | 1/2011 | Tom et al. |
| 2013/0147279 A1* | 6/2013 | Muratov ................ H02J 5/005 307/104 |
| 2014/0184141 A1 | 7/2014 | Loftus et al. |
| 2014/0320075 A1* | 10/2014 | Baurle ................ G06F 13/4282 320/108 |
| 2015/0201351 A1* | 7/2015 | Lee ....................... H04L 1/1657 320/108 |
| 2016/0064978 A1 | 3/2016 | Lei et al. |
| 2017/0207648 A1* | 7/2017 | Xiao ..................... H02J 7/0052 |

FOREIGN PATENT DOCUMENTS

| | | |
|---|---|---|
| CN | 102820682 A | 12/2012 |
| CN | 102957193 A | 3/2013 |
| CN | 103762702 A | 4/2014 |
| CN | 103795040 A | 5/2014 |
| CN | 104124483 A | 10/2014 |
| CN | 104393627 A | 3/2015 |
| EP | 2775654 A1 | 9/2014 |
| EP | 2892214 A2 | 7/2015 |
| WO | 2010140664 A1 | 12/2010 |
| WO | 2013178191 A2 | 12/2013 |

OTHER PUBLICATIONS

Examination report issued in corresponding Indian application No. 201637041879 dated Apr. 30, 2019.

* cited by examiner

QUICK CHARGING METHOD, POWER ADAPTER AND MOBILE TERMINAL, BIDIRECTIONAL COMMUNICATION USING USB INTERFACE

FIELD

The present disclosure relates to charging field, and more particularly to a quick charging method, a power adapter, and a mobile terminal.

BACKGROUND

Presently, mobile terminals (e.g., smart phones) become more and more popular with consumers. However, the power consumption of mobile terminals is great, thus mobile terminals need to be charged regularly. As the battery capacity of mobile terminals becomes greater and greater, correspondingly, the charging time becomes longer. How to realize quick charging is a problem that needed to be solved instantly.

In the present technology, to achieve the purpose of quick charging, the output current of a power adapter is directly increased without consideration of endurance of a mobile terminal, which will result in a phenomenon of overheating and even burnout of the mobile terminal, and reduces the lifespan of the mobile terminal.

SUMMARY

The embodiments of the present disclosure provide a quick charging method, a power adapter, and a mobile terminal, which can increase security of a quick charging process.

A first aspect provides a quick charging method. The method is applied to a power adapter. The power adapter is coupled to a mobile terminal via a USB interface. A power line of the USB interface is used for the power adapter to charge the mobile terminal. The power adapter supports a normal charging mode and a quick charging mode, and a charging current corresponding to the quick charging mode is greater than a charging current corresponding to the normal charging mode. The method comprises: transmitting, by the power adapter, clock signal to the mobile terminal via a first data line of the USB interface in a process of that the power adapter is coupled to the mobile terminal, wherein the clock signal is used for indicating a communication sequence between the power adapter and the mobile terminal; conducting, by the power adapter, a bidirectional communication with the mobile terminal via a second data line of the USB interface under control of the communication sequence to determine to charge the mobile terminal in the quick charging mode; and adjusting, by the power adapter, a charging current of the power adapter to the charging current corresponding to the quick charging mode to charge the mobile terminal.

In combination with the first aspect, in an implementation manner of the first aspect, the communication sequence comprises instruction transmission time slots of the power adapter and instruction reception time slots of the power adapter, and the instruction transmission time slots and the instruction reception time slots are alternatively generated. Conducting, by the power adapter, a bidirectional communication with the mobile terminal via a second data line of the USB interface under control of the communication sequence to determine to charge the mobile terminal in the quick charging mode comprises: transmitting, by the power adapter, a first instruction to the mobile terminal via the second data line during the instruction transmission time slot of the power adapter, wherein the first instruction is used for querying the mobile terminal for whether or not to activate the quick charging mode; receiving, by the power adapter, a reply instruction corresponding to the first instruction via the second data line during the instruction reception time slot of the power adapter, wherein the reply instruction corresponding to the first instruction is used for indicating that the mobile terminal agrees to activate the quick charging mode; and determining, by the power adapter, to charge the mobile terminal in the quick charging mode according to the reply instruction corresponding to the first instruction.

In combination with the first aspect or any of the above implementation manners, in another implementation manner of the first aspect, the instruction transmission time slot of the power adapter comprises a plurality of clock periods, and each of the plurality of clock periods is used for transmitting a 1-bit data.

In combination with the first aspect or any of the above implementation manners, in another implementation manner of the first aspect, the instruction transmission time slot of the power adapter comprises eight clock periods, and the first instruction comprises a 8-bit data.

In combination with the first aspect or any of the above implementation manners, in another implementation manner of the first aspect, the instruction reception time slot of the power adapter comprises a plurality of clock periods, and each of the plurality of clock periods is used for receiving a 1-bit data.

In combination with the first aspect or any of the above implementation manners, in another implementation manner of the first aspect, the instruction reception time slot of the power adapter comprises ten clock periods, and the reply instruction corresponding to the first instruction comprises a 10-bit data.

In combination with the first aspect or any of the above implementation manners, in another implementation manner of the first aspect, the first instruction is an instruction of a quick charging communication instruction set of the power adapter, and instructions of the quick charging communication instruction set have the same previous n bits.

In combination with the first aspect or any of the above implementation manners, in another implementation manner of the first aspect, each clock period of the clock signal comprises a low level of 10 μs and a high level of 500 μs.

In combination with the first aspect or any of the above implementation manners, in another implementation manner of the first aspect, the first data line is a D+ data line of the USB interface, and the second data line is a D− data line of the USB interface.

A second aspect provides a quick charging method. The method is applied to a mobile terminal. The mobile terminal is coupled to a power adapter via a USB interface. A power line of the USB interface is used for the power adapter to charge the mobile terminal. The mobile terminal supports a normal charging mode and a quick charging mode, and a charging current corresponding to the quick charging mode is greater than a charging current corresponding to the normal charging mode. The method comprises: receiving, by the mobile terminal, clock signal from the power adapter via a first data line of the USB interface in a process of that the mobile terminal is coupled to the power adapter, wherein the clock signal is used for indicating a communication sequence between the mobile terminal and the power adapter; conducting, by the mobile terminal, a bidirectional communication with the power adapter via a second data line of the USB interface under control of the communication sequence to cause the power adapter to determine to charge the mobile terminal in the quick charging mode; and receiving, by the mobile terminal, the charging current corresponding to the quick charging mode from the power adapter to charge a battery of the mobile terminal.

In combination with the second aspect, in an implementation of the second aspect, the communication sequence comprises instruction reception time slots of the mobile terminal and instruction transmission time slots of the mobile terminal, and the instruction reception time slots and the instruction transmission time slots are alternatively generated. Conducting, by the mobile terminal, a bidirectional communication with the power adapter via a second data line of the USB interface under control of the communication sequence to cause the power adapter to determine to charge the mobile terminal in the quick charging mode comprises: receiving, by the mobile terminal, a first instruction from the power adapter via the second data line during the instruction reception time slot of the mobile terminal, wherein the first instruction is used to query the mobile terminal for whether or not to activate the quick charging mode; and transmitting, by the mobile terminal, a reply instruction corresponding to the first instruction to the power adapter via the second data line during the instruction transmission time slot of the power adapter, wherein the reply instruction corresponding to the first instruction is used for indicating that the mobile terminal agrees to activate the quick charging mode.

In combination with the second aspect or any of the above implementation manners, in another implementation manner of the second aspect, the instruction reception time slot of the mobile terminal comprises a plurality of clock periods, and each of the plurality of clock periods is used for receiving a 1-bit data.

In combination with the second aspect or any of the above implementation manners, in another implementation manner of the second aspect, the instruction reception time slot of the mobile terminal comprises eight clock periods, and the first instruction comprises a 8-bit data.

In combination with the second aspect or any of the above implementation manners, in another implementation manner of the second aspect, the instruction transmission time slot of the mobile terminal comprises a plurality of clock periods, and each of the plurality of clock periods is used for transmitting a 1-bit data.

In combination with the second aspect or any of the above implementation manners, in another implementation manner of the second aspect, the instruction transmission time slot of the mobile terminal comprises ten clock periods, and the reply instruction corresponding to the first instruction comprises a 10-bit data.

In combination with the second aspect or any of the above implementation manners, in another implementation manner of the second aspect, the reply instruction corresponding to the first instruction is an instruction of a quick charging communication instruction set of the mobile terminal, and instructions of the quick charging communication instruction set have the same previous n bits.

In combination with the second aspect or any of the above implementation manners, in another implementation manner of the second aspect, each clock period of the clock signal comprises a low level of 10 µs and a high level of 500 µs.

In combination with the second aspect or any of the above implementation manners, in another implementation manner of the second aspect, the first data line is a D+ data line of the USB interface, and the second data line is a D− data line of the USB interface.

A third aspect provides a power adapter. The power adapter is coupled to a mobile terminal via a USB interface. A power line of the USB interface is used for the power adapter to charge the mobile terminal. The power adapter supports a normal charging mode and a quick charging mode, and a charging current corresponding to the quick charging mode is greater than a charging current corresponding to the normal charging mode. The power adapter comprises a communication circuit configured to transmit clock signal to the mobile terminal via a first data line of the USB interface in a process of that the power adapter is coupled to the mobile terminal, wherein the clock signal indicates a communication sequence between the power adapter and the mobile terminal. The communication circuit is further configured to conduct a bidirectional communication with the mobile terminal via a second data line of the USB interface under control of the communication sequence to determine to charge the mobile terminal in the quick charging mode. The power adapter further comprises a current adjusting circuit configured to adjust a charging current of the power adapter to the charging current corresponding to the quick charging mode to charge the mobile terminal.

In combination with the third aspect, in an implementation manner of the third aspect, the communication sequence comprises instruction transmission time slots of the power adapter and instruction reception time slots of the power adapter, and the instruction transmission time slots and the instruction reception time slots are alternatively generated. The communication circuit is configured to transmit a first instruction to the mobile terminal via the second data line during the instruction transmission time slot of the power adapter, and the first instruction is used to query the mobile terminal for whether or not to activate the quick charging mode. The communication circuit is further configured to receive a reply instruction corresponding to the first instruction via the second data line during the instruction reception time slot of the power adapter, and the reply instruction corresponding to the first instruction indicates that the mobile terminal agrees to activate the quick charging mode. The communication circuit is further configured to determine to charge the mobile terminal in the quick charging mode according to the reply instruction corresponding to the first instruction.

In combination with the third aspect or any of the above implementation manners, in another implementation manner of the third aspect, the instruction transmission time slot of the power adapter comprises a plurality of clock periods, and each of the plurality of clock periods is used for transmitting a 1-bit data.

In combination with the third aspect or any of the above implementation manners, in another implementation manner of the third aspect, the instruction transmission time slot of the power adapter comprises eight clock periods, and the first instruction comprises a 8-bit data.

In combination with the third aspect or any of the above implementation manners, in another implementation manner of the third aspect, the instruction reception time slot of the power adapter comprises a plurality of clock periods, and each of the plurality of clock periods is used for receiving a 1-bit data.

In combination with the third aspect or any of the above implementation manners, in another implementation manner of the third aspect, the instruction reception time slot of the power adapter comprises ten clock periods, and the reply instruction corresponding to the first instruction comprises a 10-bit data.

In combination with the third aspect or any of the above implementation manners, in another implementation manner of the third aspect, the first instruction is an instruction of a quick charging communication instruction set of the power adapter, and instructions of the quick charging communication instruction set have the same previous n bits.

In combination with the third aspect or any of the above implementation manners, in another implementation manner of the third aspect, each clock period of the clock signal comprises a low level of 10 μs and a high level of 500 μs.

In combination with the third aspect or any of the above implementation manners, in another implementation manner of the third aspect, the first data line is a D+ data line of the USB interface, and the second data line is a D− data line of the USB interface.

A fourth aspect provides a mobile terminal. The mobile terminal is coupled to a power adapter via a USB interface. A power line of the USB interface is used for the power adapter to charge the mobile terminal. The mobile terminal supports a normal charging mode and a quick charging mode, and a charging current corresponding to the quick charging mode is greater than a charging current corresponding to the normal charging mode. The mobile terminal includes a communication circuit configured to receive clock signal from the power adapter via a first data line of the USB interface in a process of that the mobile terminal is coupled to the power adapter, wherein the clock signal indicates a communication sequence between the mobile terminal and the power adapter. The communication circuit is further configured to conduct a bidirectional communication with the power adapter via a second data line of the USB interface under control of the communication sequence to cause the power adapter to determine to charge the mobile terminal in the quick charging mode. The mobile terminal further comprises a charging circuit configured to receive the charging current corresponding to the quick charging mode from the power adapter to charge a battery of the mobile terminal.

In combination with the fourth aspect, in an implementation manner of the fourth aspect, the communication sequence comprises instruction reception time slots of the mobile terminal and instruction transmission time slots of the mobile terminal, and the instruction reception time slots and the instruction transmission time slots are alternatively generated. The communication circuit is configured to receive a first instruction from the power adapter via the second data line during the instruction reception time slot of the mobile terminal, and the first instruction is used to query the mobile terminal for whether or not to activate the quick charging mode. The communication circuit is further configured to transmit a reply instruction corresponding to the first instruction to the power adapter via the second data line during the instruction transmission time slot of the mobile terminal, and the reply instruction corresponding to the first instruction is indicates that the mobile terminal agrees to activate the quick charging mode.

In combination with the fourth aspect or any of the above implementation manners, in another implementation manner of the fourth aspect, the instruction reception time slot of the mobile terminal comprises a plurality of clock periods, and each of the plurality of clock periods is used for receiving a 1-bit data.

In combination with the fourth aspect or any of the above implementation manners, in another implementation manner of the fourth aspect, the instruction reception time slot of the mobile terminal comprises eight clock periods, and the first instruction comprises a 8-bit data.

In combination with the fourth aspect or any of the above implementation manners, in another implementation manner of the fourth aspect, the instruction transmission time slot of the mobile terminal comprises a plurality of clock periods, and each of the plurality of clock periods is used for transmitting a 1-bit data.

In combination with the fourth aspect or any of the above implementation manners, in another implementation manner of the fourth aspect, the instruction transmission time slot of the mobile terminal comprises ten clock periods, and the reply instruction corresponding to the first instruction comprises a 10-bit data.

In combination with the fourth aspect or any of the above implementation manners, in another implementation manner of the fourth aspect, the reply instruction corresponding to the first instruction is an instruction of a quick charging communication instruction set of the mobile terminal, and instructions of the quick charging communication instruction set have the same previous n bits.

In combination with the fourth aspect or any of the above implementation manners, in another implementation manner of the fourth aspect, each clock period of the clock signal comprises a low level of 10 μs and a high level of 500 μs.

In combination with the fourth aspect or any of the above implementation manners, in another implementation manner of the fourth aspect, the first data line is a D+ data line of the USB interface, and the second data line is a D− data line of the USB interface.

In embodiments of the present disclosure, the power adapter does not increase the charging current blindly to implement quick charging, but negotiates with the mobile terminal via the bidirectional communication with the mobile terminal to determine whether or not the quick charging mode can be adopted. Comparing with the present technology, the security of the quick charging process is improved.

BRIEF DESCRIPTION OF THE DRAWINGS

To better illustrate the technical solution of embodiments of the present disclosure, the following descriptions will briefly illustrate the accompanying drawings described in the embodiments. Obviously, the following described accompanying drawings are some embodiments of the present disclosure. Those skilled in the art can obtain other accompanying drawings according to the described accompanying drawings without creative work.

DETAILED DESCRIPTION OF ILLUSTRATED EMBODIMENTS

The technical solution of embodiments of the present disclosure will be described clearly and completely in combination with the accompanying drawings of the embodiments of the present disclosure. Obviously, the described embodiments are a part of embodiments of the present disclosure, and not all of the embodiments. According to the embodiments of the present disclosure, other embodiments obtained by those skilled in the art without creative work all fall within the protection scope of the present disclosure.

Figure 1:
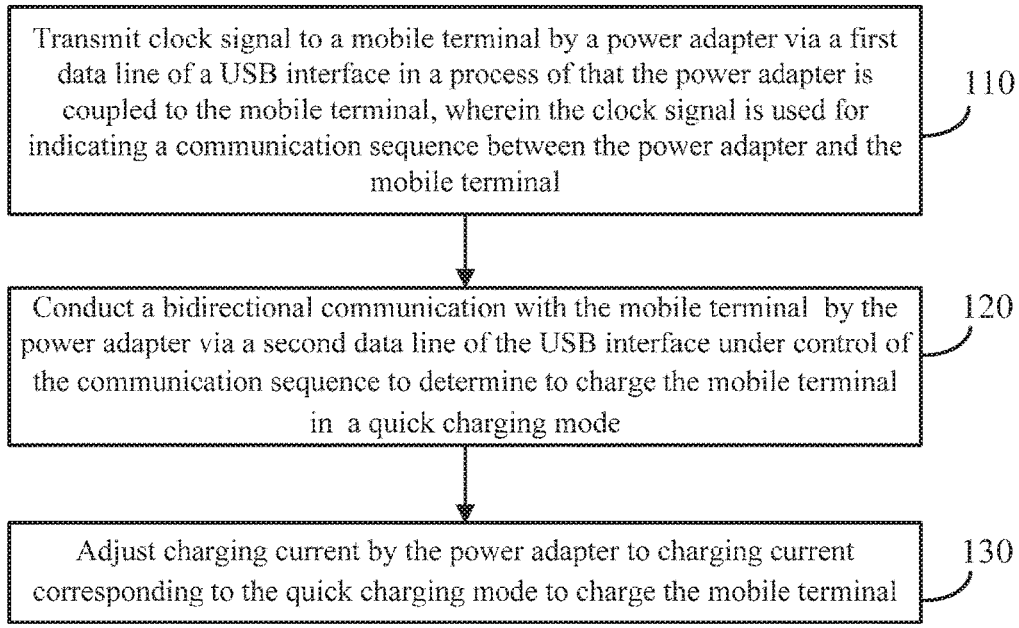
FIG. 1 is a schematic flow chart of a quick charging method in accordance with an embodiment of the present disclosure.

FIG. 1 is a schematic flow chart of a quick charging method in accordance with an embodiment of the present disclosure. The method is applied to a power adapter. The power adapter is coupled to a mobile terminal via a universal serial bus (USB) interface. The USB interface can be a normal USB interface, and can also be a micro USB interface. A power line of the USB interface is used for the power adapter to charge the mobile terminal, and the power line of the USB interface can be a VBus line and/or grounding line. The power adapter supports a normal charging mode and a quick charging mode, and a charging current corresponding to the quick charging mode is greater than a charging current corresponding to the normal charging mode. For example, the charging current corresponding to the normal charging mode is generally less than 2.5 A, and the charging current corresponding to the quick charging mode can be greater than 3 A.

The method of FIG. 1 includes the following.

At block 110, the power adapter transmits clock signal to the mobile terminal via a first data line of the USB interface in a process of that the power adapter is coupled to the mobile terminal, and the clock signal is used to indicate a communication sequence between the power adapter and the mobile terminal.

It should be understood that the power adapter actively transmits the clock signal to the mobile terminal, and keeps transmission of the clock signal during the whole process of that the power adapter is coupled to the mobile terminal.

At block 120, the power adapter conducts a bidirectional communication with the mobile terminal via a second data line of the USB interface under control of the communication sequence, so as to determine to charge the mobile terminal in the quick charging mode.

At block 130, the power adapter adjusts a charging current of the power adapter to the charging current corresponding to the quick charging mode to charge the mobile terminal.

In detail, the power adapter can record the charging current corresponding to the quick charging mode in advance. When it is determined that the quick charging mode is adopted to charge the mobile terminal, the charging current of the power adapter is directly adjusted to the charging current corresponding to the quick charging mode. Or, the power adapter can negotiate with the mobile terminal via the bidirectional communication to determine the charging current corresponding to the quick charging mode. After negotiation, the charging current is adjusted.

In embodiments of the present disclosure, the power adapter does not increase the charging current blindly to implement quick charging, but negotiates with the mobile terminal via the bidirectional communication with the mobile terminal to determine whether or not the quick charging mode can be adopted. Comparing with the present technology, the security of the quick charging process is improved.

Optionally, in an embodiment, the communication sequence includes instruction transmission time slots of the power adapter and instruction reception time slots of the power adapter, and the instruction transmission time slots and the instruction reception time slots are alternatively generated. Conducting, by the power adapter, a bidirectional communication with the mobile terminal via a second data line of the USB interface under control of the communication sequence to determine to charge the mobile terminal in the quick charging mode, includes: transmitting, by the power adapter, a first instruction to the mobile terminal via the second data line during the instruction transmission time slot of the power adapter, wherein the first instruction is used to query the mobile terminal for whether or not to activate the quick charging mode; receiving, by the power adapter, a reply instruction corresponding to the first instruction via the second data line during the instruction reception time slot of the power adapter, wherein the reply instruction corresponding to the first instruction is used for indicating that the mobile terminal agrees to activate the quick charging mode; and determining, by the power adapter, to charge the mobile terminal in the quick charging mode according to the reply instruction corresponding to the first instruction.

Optionally, in an embodiment, the instruction transmission time slot of the power adapter includes a number of clock periods, and each clock period is used for transmitting a 1-bit data.

Optionally, in an embodiment, the instruction transmission time slot of the power adapter includes eight clock periods, and the first instruction includes a 8-bit data.

Optionally, in an embodiment, the instruction reception time slot of the power adapter includes a number of clock periods, and each clock period is used for receiving 1-bit data.

Optionally, in an embodiment, the instruction reception time slot of the power adapter includes ten clock periods, and the reply instruction corresponding to the first instruction includes a 10-bit data.

Optionally, in an embodiment, the first instruction is an instruction of the quick charging communication instruction set of the power adapter, and instructions of the quick charging communication instruction set have the same previous n bits.

Optionally, in an embodiment, each clock period of the clock signal includes a low level of 10 us and a high level of 500 us.

Optionally, in an embodiment, the first data line is a D+ data line of the USB interface, and the second data line is a D− data line of the USB interface.

The above description in combination with FIG. 1 describes the quick charging method of the embodiments of the present disclosure executed by the power adapter. The following description in combination with FIG. 2 will describes the quick charging method of the embodiments of the present disclosure executed by the mobile terminal.

It can be understood that interaction and relevance properties and functions of the power adapter and the mobile terminal described in the quick charging method executed by the mobile terminal corresponds to the description of the quick charging method executed by the power adapter. For simplicity, repeated description will be omitted appropriately.

Figure 2:
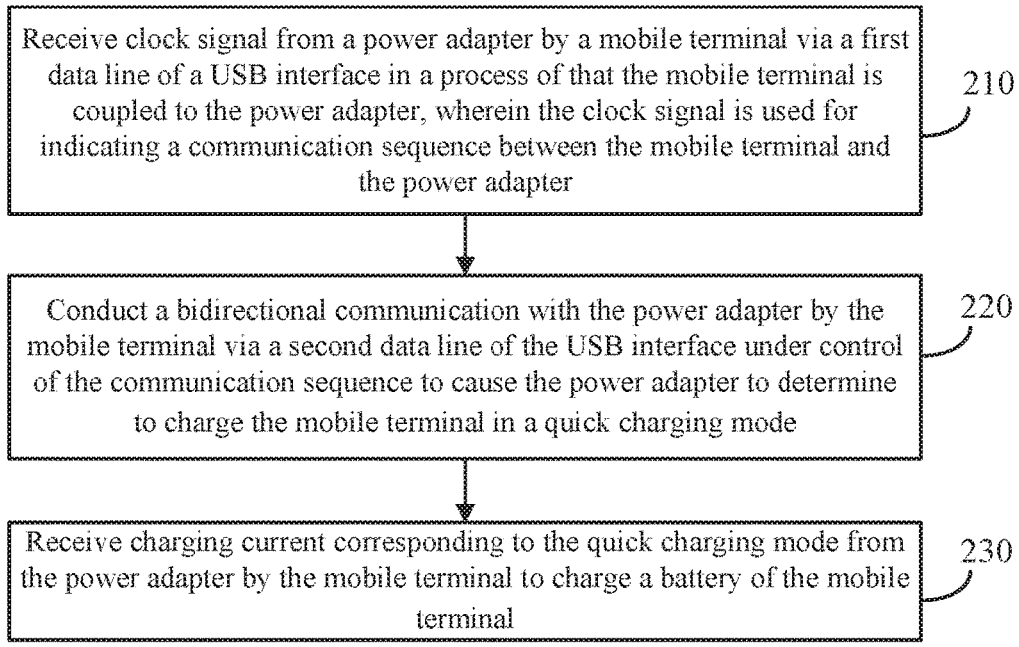
FIG. 2 is a schematic flow chart of a quick charging method in accordance with another embodiment of the present disclosure.

FIG. 2 is a schematic flow chart of a quick charging method in accordance with an embodiment of the present disclosure. The method illustrated in FIG. 2 is applied to a mobile terminal. The mobile terminal is coupled to a power adapter via a USB interface. A power line of the USB interface is used for the power adapter to charge the mobile terminal. The mobile terminal supports a normal charging mode and a quick charging mode, and a charging current corresponding to the quick charging mode is greater than a charging current corresponding to the normal charging mode. The method of FIG. 2 includes the following.

At block 210, the mobile terminal receives clock signal from the power adapter via a first data line of the USB interface in a process of that the mobile terminal is coupled to the power adapter, and the clock signal is used to indicate a communication sequence between the mobile terminal and the power adapter.

At block 220, the mobile terminal conducts a bidirectional communication with the power adapter via a second data line of the USB interface under control of the communication sequence, so as to cause the power adapter to determine to charge the mobile terminal in the quick charging mode.

At block 230, the mobile terminal receives the charging current corresponding to the quick charging mode from the power adapter to charge a battery of the mobile terminal.

In embodiments of the present disclosure, the power adapter does not increase the charging current blindly to implement quick charging, but negotiates with the mobile terminal via the bidirectional communication with the mobile terminal to determine whether or not the quick charging mode can be adopted. Comparing with related arts, the security of the quick charging process is improved.

Optionally, in an embodiment, the communication sequence includes instruction reception time slots of the mobile terminal and instruction transmission time slots of the mobile terminal, and the instruction reception time slots and the instruction reception time slots are alternatively generated. Conducting, by the mobile terminal, the bidirectional communication with the power adapter via a second data line of the USB interface under control of the communication sequence to cause the power adapter to determine to charge the mobile terminal in the quick charging mode includes: receiving, by the mobile terminal, a first instruction from the power adapter via the second data line during the instruction reception time slot of the mobile terminal, wherein the first instruction is used to query the mobile terminal for whether or not to activate the quick charging mode; transmitting, by the mobile terminal, a reply instruction corresponding to the first instruction via the second data line during the instruction transmission time slot of the mobile terminal, wherein the reply instruction corresponding to the first instruction is used for indicating that the mobile terminal agrees to activate the quick charging mode.

Optionally, in an embodiment, the instruction reception time slot of the mobile terminal includes a number of clock periods, and each clock period is used for receiving a 1-bit data.

Optionally, in an embodiment, the instruction reception time slot of the mobile terminal includes eight clock periods, and the first instruction includes a 8-bit data.

Optionally, in an embodiment, the instruction transmission time slot of the mobile terminal includes a number of clock periods, and each clock period is used for transmitting 1-bit data.

Optionally, in an embodiment, the instruction transmission time slot of the mobile terminal includes ten clock periods, and the reply instruction corresponding to the first instruction includes a 10-bit data.

Optionally, in an embodiment, the reply instruction corresponding to the first instruction is an instruction of the quick charging communication instruction set of the mobile terminal, and instructions of the quick charging communication instruction set have the same previous n bits.

Optionally, in an embodiment, each clock period of the clock signal includes a low level of 10 us and a high level of 500 us.

Optionally, in an embodiment, the first data line is a D+ data line of the USB interface, and the second data line is a D− data line of the USB interface.

Figure 3:
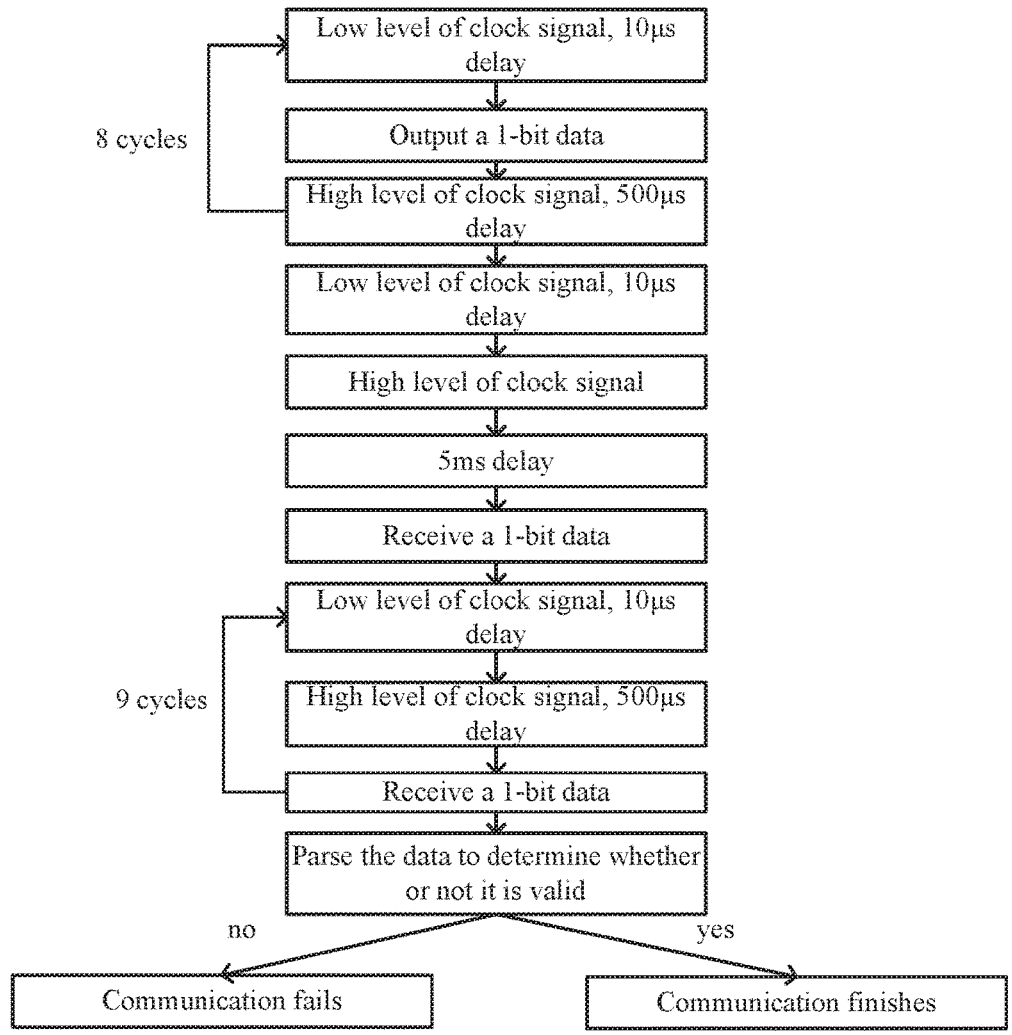
FIG. 3 is a schematic view showing that a power adapter implements a data reception and transmission in accordance with an embodiment of the present disclosure.
Figure 4:
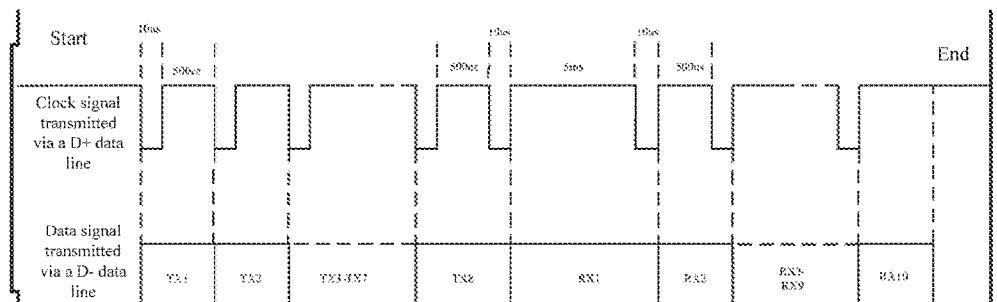
FIG. 4 is a schematic view of a sequence of that the power adapter implements a communication in accordance with an embodiment of the present disclosure.
Figure 5:
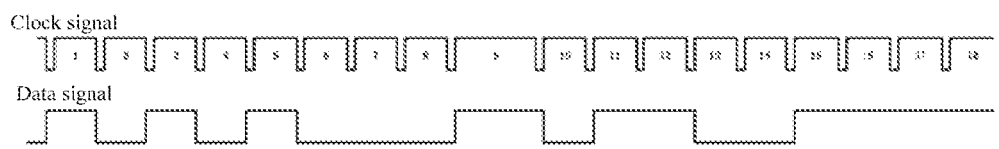
FIG. 5 is a schematic view of a sequence of that the power adapter implements a communication in accordance with another embodiment of the present disclosure.

The following will describe embodiments of the present disclosure more specifically in combination with detailed examples. It should be noted that examples illustrated in FIGS. 3-5 are just used to help those skilled in the art to understand the embodiments of the present disclosure, and not used to limit the embodiments of the present disclosure to detailed values or detailed scenarios which are shown in the examples. Apparently, those skilled in the art can make various equivalent modification or change according to the examples shown in FIGS. 3-5, and such modification or change shall fall within the scope of the embodiments of the present disclosure.

Firstly, the quick charging communication instruction set of the power adapter and the mobile terminal can be defined. For example, the quick charging communication instruction set is shown in the table 1.

TABLE 1

| Quick charging communication instruction set | | |
|---|---|---|
| Instruction 1: requesting for quick charging | | |
| Power adapter −> Mobile terminal | 10101000 | 0xA8 |
| Mobile terminal −> Power adapter | 101XYYYYYY | X: 1 −> Agree 0 −> Disagree, Path impedance = YYYYYY * 5(mΩ) |
| Instruction 2: querying whether or not a voltage of the power adapter is proper | | |
| Power adapter −> Mobile terminal | 10100100 | 0xA4 |
| Mobile terminal −> Power adapter | 1010XX0000 | XX: 11 −> Proper 10 −> High 01 −> Low 00 −> Error |
| Instruction 3: querying for a maximum charging current which is currently supported by the mobile terminal | | |
| Power adapter −> Mobile terminal | 10100110 | 0xA6 |
| Mobile terminal −> Power adapter | 1010XXXXXX | Maximum charging current |

TABLE 1-continued

| Quick charging communication instruction set | | | |
|---|---|---|---|
| | | | currently supported by the mobile terminal = 3000 + (XXXXXX * 250)(mA) |
| Instruction 4: querying for a current voltage of a battery of the mobile terminal | | | |
| Power adapter -> Mobile terminal | 10100010 | | 0xA2 |
| Mobile terminal -> Power adapter | 101XYYYYYY | | X: 1 -> Being charged 0 -> Uncharged, Battery voltage = 3404 + (YYYYYY * 16)(mV) |
| Instruction 5: informing the mobile terminal that USB connection is poor and quick charging should be stopped | | | |
| Power adapter -> Mobile terminal | 10110010 | | 0xB2 |
| Mobile terminal -> Power adapter | NONE | | |

From table 1, it can be seen that in each communication the power adapter firstly transmits a 8-bit data, and then the mobile terminal returns a 10-bit data. When the power adapter transmits a data, the power adapter can firstly transmit most significant bit (MSB). Similarly, when the power adapter receives a data, the power adapter firstly receives MSB. The clock signal for data transmission and data reception of the power adapter can be provided by the power adapter.

When the power adapter transmits a data, the power adapter transmits each bit of the data before transmitting the clock interrupt signal, which can guarantee the accuracy of the data received by the mobile terminal. When the power adapter receives a data, the power adapter can firstly transmit the clock interrupt signal, and then receive each bit of the data after a certain time, which can guarantee the accuracy and reliability of the data received by the power adapter.

FIG. 3 is a schematic view showing that the power adapter implements a data reception and data transmission in accordance with an embodiment of the present disclosure. For FIG. 3, there are a number of methods for parsing a data to determine whether or not the data is valid. For example, previous n bits of a data can be defined as 101 in advance. When previous 3 bits of a data received by the power adapter is not 101, the data is determined as an invalid data, and communication fails. Or, a received data is defined to include 10 bits in advance. If a received data does not include 10 bits, the received data is determined as an invalid data, and communication fails.

FIG. 4 is a schematic view of a sequence of that the power adapter implements a communication in accordance with an embodiment of the present disclosure. From FIG. 4, a relationship between a communication sequence indicated by the clock signal which is transmitted by the D+ data line and data signal transmitted by the D- data line is shown. FIG. 5 illustrates a detailed example. In FIG. 5, after the power adapter transmits the instruction 10101000 to the mobile terminal, the power adapter receives the reply instruction 1011001111 from the mobile terminal.

Figure 6:
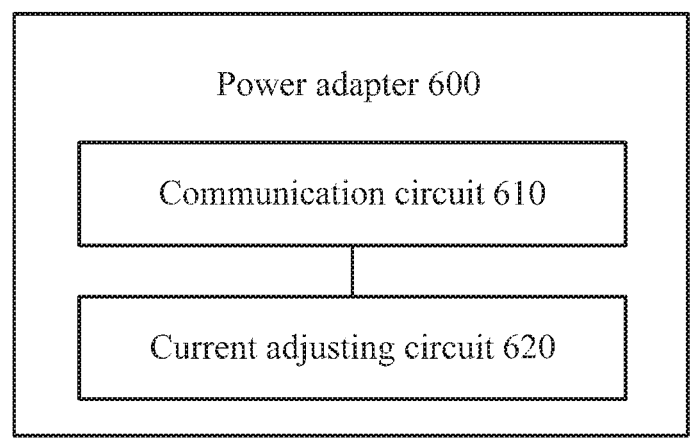
FIG. 6 is a diagrammatic view of a structure of a power adapter in accordance with an embodiment of the present disclosure.
Figure 7:
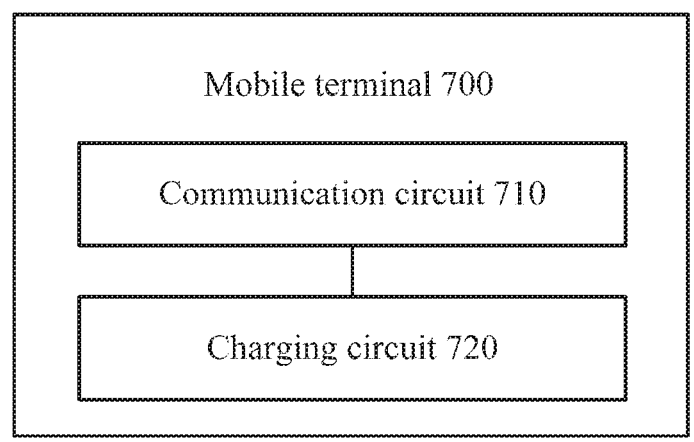
FIG. 7 is diagrammatic view of a structure of a mobile terminal in accordance with an embodiment of the present disclosure.

In combination with FIGS. 1-5, the above describes the quick charging method of the embodiments of the present disclosure. Referring to FIGS. 6-7, the following will specifically describe the power adapter and the mobile terminal of the embodiments of the present disclosure. It can be understood that the power adapter of FIG. 6 can implement various steps executed by the power adapter of FIGS. 1-5, and the mobile terminal of FIG. 7 can implement various steps executed by the mobile terminal of FIGS. 1-5. To avoid repetition, detailed description will be omitted.

FIG. 6 is a schematic structural diagram of a power adapter in accordance with an embodiment of the present disclosure. A power adapter 600 in FIG. 6 is coupled to a mobile terminal via a USB interface. A power line of the USB interface is used for the power adapter 600 to charge the mobile terminal. The power adapter 600 supports a normal charging mode and a quick charging mode, and a charging current corresponding to the quick charging mode is greater than a charging current corresponding to the normal charging mode. The power adapter 600 includes the following.

A communication circuit 610 is configured to transmit clock signal to the mobile terminal via a first data line of the USB interface in a process of that the power adapter 600 is coupled to the mobile terminal, and the clock signal is used to indicate a communication sequence between the power adapter 600 and the mobile terminal. The communication circuit 610 is further configured to conduct a bidirectional communication with the mobile terminal via a second data line of the USB interface under control of the communication sequence, so as to determine to charge the mobile terminal in the quick charging mode.

A current adjusting circuit 620 is configured to adjust a charging current of the power adapter to the charging current corresponding to the quick charging mode to charge the mobile terminal.

In embodiments of the present disclosure, the power adapter does not increase the charging current blindly to implement quick charging, but negotiates with the mobile terminal via the bidirectional communication with the mobile terminal to determine whether or not the quick charging mode can be adopted. Comparing with the related art, the security of the quick charging process is improved.

Optionally, in an embodiment, the communication sequence includes instruction transmission time slots of the power adapter 600 and instruction reception time slots of the power adapter 600, and the instruction transmission time slots and the instruction reception time slots are alternatively generated. The communication circuit 610 is configured to transmit a first instruction to the mobile terminal via the second data line during the instruction transmission time slot of the power adapter 600, and the first instruction is used to query the mobile terminal for whether or not to activate the quick charging mode. The communication circuit 610 is further configured to receive a reply instruction corresponding to the first instruction via the second data line during the instruction reception time slot of the power adapter 600, and the reply instruction corresponding to the first instruction is used for indicating that the mobile terminal agrees to activate the quick charging mode. The communication circuit 610 is further configured to determine to charge the mobile terminal in the quick charging mode according to the reply instruction corresponding to the first instruction.

Optionally, in an embodiment, the instruction transmission time slot of the power adapter 600 includes a number of clock periods, and each clock period is used for transmitting a 1-bit data.

Optionally, in an embodiment, the instruction transmission time slot of the power adapter 600 includes eight clock periods, and the first instruction includes a 8-bit data.

Optionally, in an embodiment, the instruction reception time slot of the power adapter 600 includes a number of clock periods, and each clock period is used for receiving a 1-bit data.

Optionally, in an embodiment, the instruction reception time slot of the power adapter 600 includes ten clock periods, and the reply instruction corresponding to the first instruction includes a 10-bit data.

Optionally, in an embodiment, the first instruction is an instruction of the quick charging communication instruction set of the power adapter 600, and instructions of the quick charging communication instruction set have the same previous n bits.

Optionally, in an embodiment, each clock period of the clock signal includes a low level of 10 us and a high level of 500 us.

Optionally, in an embodiment, the first data line is a D+ data line of the USB interface, and the second data line is a D− data line of the USB interface.

FIG. 7 is a schematic block diagram of a mobile terminal in accordance with an embodiment of the present disclosure. A mobile terminal 700 in FIG. 7 is coupled to a power adapter via a USB interface. A power line of the USB interface is used for the power adapter to charge the mobile terminal 700. The mobile terminal 700 supports a normal charging mode and a quick charging mode, and a charging current corresponding to the quick charging mode is greater than a charging current corresponding to the normal charging mode. The mobile terminal 700 includes the following.

A communication circuit 710 is configured to receive clock signal from the power adapter via a first data line of the USB interface in a process of that the mobile terminal 700 is coupled to the power adapter, and the clock signal is used to indicate a communication sequence between the mobile terminal 700 and the power adapter. The communication circuit 710 is further configured to conduct a bidirectional communication with the power adapter via a second data line of the USB interface under control of the communication sequence, so as to cause the power adapter to determine to charge the mobile terminal 700 in the quick charging mode.

A charging circuit 720 is configured to receive the charging current corresponding to the quick charging mode from the power adapter to charge a battery of the mobile terminal 700.

In embodiments of the present disclosure, the power adapter does not increase the charging current blindly to implement quick charging, but negotiates with the mobile terminal via the bidirectional communication with the mobile terminal to determine whether or not the quick charging mode can be adopted. Comparing to the present technology, the security of the quick charging process is improved.

Optionally, in an embodiment, the communication sequence includes instruction reception time slots of the mobile terminal 700 and instruction transmission time slots of the mobile terminal 700, and the instruction reception time slots and the instruction transmission time slots are alternatively generated. The communication circuit 710 is configured to receive a first instruction from the power adapter via the second data line during the instruction reception time slot of the mobile terminal 700, and the first instruction is used to query the mobile terminal 700 for whether or not to activate the quick charging mode. The communication circuit 710 is further configured to transmit a reply instruction corresponding to the first instruction to the power adapter via the second data line during the instruction transmission time slot of the mobile terminal 700, and the reply instruction corresponding to the first instruction is used for indicating that the mobile terminal 700 agrees to activate the quick charging mode.

Optionally, in an embodiment, the instruction reception time slot of the mobile terminal 700 includes a number of clock periods, and each clock period is used for receiving a 1-bit data.

Optionally, in an embodiment, the instruction reception time slot of the mobile terminal 700 includes eight clock periods, and the first instruction includes a 8-bit data.

Optionally, in an embodiment, the instruction transmission time slot of the mobile terminal 700 includes a number of clock periods, and each clock period is used for transmitting a 1-bit data.

Optionally, in an embodiment, the instruction transmission time slot of the mobile terminal 700 includes ten clock periods, and the reply instruction corresponding to the first instruction includes a 10-bit data.

Optionally, in an embodiment, the reply instruction corresponding to the first instruction is an instruction of the quick charging communication instruction set of the mobile terminal 700, and instructions of the quick charging communication instruction set have the same previous n bits.

Optionally, in an embodiment, each clock period of the clock signal includes a low level of 10 us and a high level of 500 us.

Optionally, in an embodiment, the first data line is a D+ data line of the USB interface, and the second data line is a D− data line of the USB interface.

Those skilled in the art should appreciate that units and programming steps of various examples described in the embodiments of the present disclosure can be realized by electronic hardware or a combination of computer software and electronic hardware. Whether these functions are realized by hardware or software depends on particular applications and design constraint conditions. For each particular application, professionals can employ different methods to realize described functions, but this realization should fall into the scope of the present disclosure.

For convenience and simplicity, those skilled in the art can clearly understand that when the specific work processes of the above described systems, devices, and units are described, the corresponding processes of the above method embodiments can be referred, which will not be repeated herein.

In several embodiments provided by the present disclosure, it can be understood that the disclosed systems, devices, and methods can be implemented by other manners. For example, the device embodiments described above are only schematic. For example, the units are divided according to logic functions and can be divided by another manner in an actual implementation. For example, several units or assemblies can be combined or can be integrated into another system, or some features can be ignored, or are not executed. Another point is that mutual coupling or direct coupling or communication connection shown or discussed herein can be indirect coupling or communication connection through certain interfaces, devices, or units, and can be in the form of electricity, machine, or other.

The units illustrated as separate units can be or cannot be physically separated, and components shown in units can be or cannot be physical units, that is, can be in a place, or can be distributed in several network units. A part of or all of the units can be selected according to actual need to realize the purpose of the solution of the embodiments.

Additionally, various functional units in the embodiments of the present disclosure can be integrated into one processing unit, or various functional units can exist alone, or two or more units can be integrated into one unit.

If the functions can be realized in the form of software functional units and can be sold or used as stand-alone products, they can be stored in a computer-readable storage medium. Based on such understanding, the technical solution of the present disclosure or the part that contributes to the existing technology or a part of the technical solution can be embodied in the form of a software product. The computer software product can be stored in a storage medium, and include a plurality of instructions configured to direct a computer device (personal computer, server, or network device) to execute all of or a part of steps of various embodiments of the present disclosure. The storage mediums described above include a U disk, a mobile disk, a read-only memory (ROM), a random access memory (RAM), a disc, a compact disc, or other medium storing program codes.

The foregoing descriptions are merely preferred embodiments of the present disclosure, rather than limiting the present disclosure. Any one skilled in the art can easily make change or alterations within the technology range of the present disclosure, and those change or alterations shall fall within the protection scope of the present disclosure. Therefore, the protection scope of the present disclosure shall be limited by the protection scope of the claims.

What is claimed is:

1. A quick charging method, the method comprising:
    coupling a power adapter to a mobile terminal via a Universal Serial Bus (USB) interface, a power line of the USB interface being used for the power adapter to charge the mobile terminal, the power adapter supporting a normal charging mode and a quick charging mode, a charging current corresponding to the quick charging mode being greater than a charging current corresponding to the normal charging mode;
    transmitting, by the power adapter, a clock signal to the mobile terminal via a first data line of the USB interface when the power adapter becomes coupled to the mobile terminal, wherein the clock signal indicates a communication sequence between the power adapter and the mobile terminal;
    conducting, by the power adapter, a bidirectional communication with the mobile terminal via a second data line of the USB interface under control of the communication sequence, so as to query the mobile terminal for an indication of whether to activate the quick charging mode and to determine to charge the mobile terminal in the quick charging mode when the indication indicates to activate the quick charging mode; and
    adjusting, by the power adapter, a charging current of the power adapter to the charging current corresponding to the quick charging mode to charge the mobile terminal.

2. The method of claim 1, wherein the communication sequence comprises instruction transmission time slots of the power adapter and instruction reception time slots of the power adapter, and the instruction transmission time slots and the instruction reception time slots are alternatively generated;
    wherein conducting, by the power adapter, the bidirectional communication with the mobile terminal via the second data line of the USB interface under the control of the communication sequence comprises:
    transmitting, by the power adapter, a first instruction to the mobile terminal via the second data line during the instruction transmission time slot of the power adapter, wherein the first instruction is used for querying the mobile terminal for whether or not to activate the quick charging mode;
    receiving, by the power adapter, a reply instruction corresponding to the first instruction via the second data line during the instruction reception time slot of the power adapter, wherein the reply instruction corresponding to the first instruction indicates that the mobile terminal agrees to activate the quick charging mode; and
    determining, by the power adapter, to charge the mobile terminal in the quick charging mode according to the reply instruction corresponding to the first instruction.

3. The method of claim 2, wherein the instruction transmission time slot of the power adapter comprises a plurality of clock periods, and each of the plurality of clock periods is used for transmitting a 1-bit data.

4. The method of claim 3, wherein the instruction transmission time slot of the power adapter comprises eight clock periods, and the first instruction comprises a 8-bit data.

5. The method of claim 2, wherein the instruction reception time slot of the power adapter comprises a plurality of clock periods, and each of the plurality of clock periods is used for receiving a 1-bit data.

6. The method of claim 5, wherein the instruction reception time slot of the power adapter comprises ten clock periods, and the reply instruction corresponding to the first instruction comprises a 10-bit data.

7. The method of claim 2, wherein the first instruction is an instruction of a quick charging communication instruction set of the power adapter, and instructions of the quick charging communication instruction set have the same previous n bits.

8. The method of claim 1, wherein each clock period of the clock signal comprises a low level of 10 µs and a high level of 500 µs.

9. The method of claim 1, wherein the first data line is a D+ data line of the USB interface, and the second data line is a D− data line of the USB interface.

10. A power adapter, the power adapter being configured to be coupled to a mobile terminal via a Universal Serial Bus (USB) interface, a power line of the USB interface being used for the power adapter to charge the mobile terminal, the power adapter supporting a normal charging mode and a quick charging mode, a charging current corresponding to the quick charging mode being greater than a charging current corresponding to the normal charging mode, the power adapter comprising:
    a communication circuit configured to transmit a clock signal to the mobile terminal via a first data line of the USB interface when the power adapter becomes coupled to the mobile terminal, wherein the clock signal indicates a communication sequence between the power adapter and the mobile terminal; and the communication circuit is further configured to conduct a bidirectional communication with the mobile terminal via a second data line of the USB interface under control of the communication sequence, so as to query the mobile terminal for an indication of whether to activate the quick charging mode and to determine to charge the mobile terminal in the quick charging mode when the indication indicates to activate the quick charging mode; and a current adjusting circuit configured to adjust a charging current of the power adapter to the charging current corresponding to the quick charging mode to charge the mobile terminal.

11. The power adapter of claim 10, wherein the communication sequence comprises instruction transmission time slots of the power adapter and instruction reception time slots of the power adapter, and the instruction transmission time slots and the instruction reception time slots are alternatively generated; the communication circuit is configured to transmit a first instruction to the mobile terminal via the second data line during the instruction transmission time slot of the power adapter, and the first instruction is used to query the mobile terminal for whether or not to activate the quick charging mode; the communication circuit is further configured to receive a reply instruction corresponding to the first instruction via the second data line during the instruction reception time slot of the power adapter, and the reply instruction corresponding to the first instruction indicates that the mobile terminal agrees to activate the quick charging mode; and the communication circuit is further configured to determine to charge the mobile terminal in the quick charging mode according to the reply instruction corresponding to the first instruction.

12. The power adapter of claim 11, wherein the instruction transmission time slot of the power adapter comprises a plurality of clock periods, and each of the plurality of clock periods is used for transmitting a 1-bit data.

13. The power adapter of claim 12, wherein the instruction transmission time slot of the power adapter comprises eight clock periods, and the first instruction comprises a 8-bit data.

14. The power adapter of claim 11, wherein the instruction reception time slot of the power adapter comprises a plurality of clock periods, and each of the plurality of clock periods is used for receiving a 1-bit data.

15. The power adapter of claim 14, wherein the instruction reception time slot of the power adapter comprises ten clock periods, and the reply instruction corresponding to the first instruction comprises a 10-bit data.

16. The power adapter of claim 11, wherein the first instruction is an instruction of a quick charging communication instruction set of the power adapter, and instructions of the quick charging communication instruction set have the same previous n bits.

17. The power adapter of claim 10, wherein each clock period of the clock signal comprises a low level of 10 μs and a high level of 500 μs.

18. The power adapter of claim 10, wherein the first data line is a D+ data line of the USB interface, and the second data line is a D− data line of the USB interface.

19. A mobile terminal, the mobile terminal being configured to be coupled to a power adapter via a Universal Serial Bus (USB) interface, a power line of the USB interface being used for the power adapter to charge the mobile terminal, the mobile terminal supporting a normal charging mode and a quick charging mode, a charging current corresponding to the quick charging mode being greater than a charging current corresponding to the normal charging mode, the mobile terminal comprising:

a communication circuit configured to receive a clock signal from the power adapter via a first data line of the USB interface when the mobile terminal becomes coupled to the power adapter, wherein the clock signal indicates a communication sequence between the mobile terminal and the power adapter; the communication circuit is further configured to conduct a bidirectional communication with the power adapter via a second data line of the USB interface under control of the communication sequence, so as to query the mobile terminal for an indication of whether to activate the quick charging mode and to determine to charge the mobile terminal in the quick charging mode when the indication indicates to activate the quick charging mode; and a charging circuit configured to receive the charging current corresponding to the quick charging mode from the power adapter to charge a battery of the mobile terminal.

20. The mobile terminal of claim 19, wherein the communication sequence comprises instruction reception time slots of the mobile terminal and instruction transmission time slots of the mobile terminal, and the instruction reception time slots and the instruction transmission time slots are alternatively generated; the communication circuit is configured to receive a first instruction from the power adapter via the second data line during the instruction reception time slot of the mobile terminal, and the first instruction is used to query the mobile terminal for whether or not to activate the quick charging mode; and the communication circuit is further configured to transmit a reply instruction corresponding to the first instruction to the power adapter via the second data line during the instruction transmission time slot of the power adapter, and the reply instruction corresponding to the first instruction indicates that the mobile terminal agrees to activate the quick charging mode.

* * * * *